March 12, 1957 R. M. CARSON 2,784,959
SAFETY APPARATUS FOR FLUID-DISTRIBUTION LINES
Filed March 2, 1955
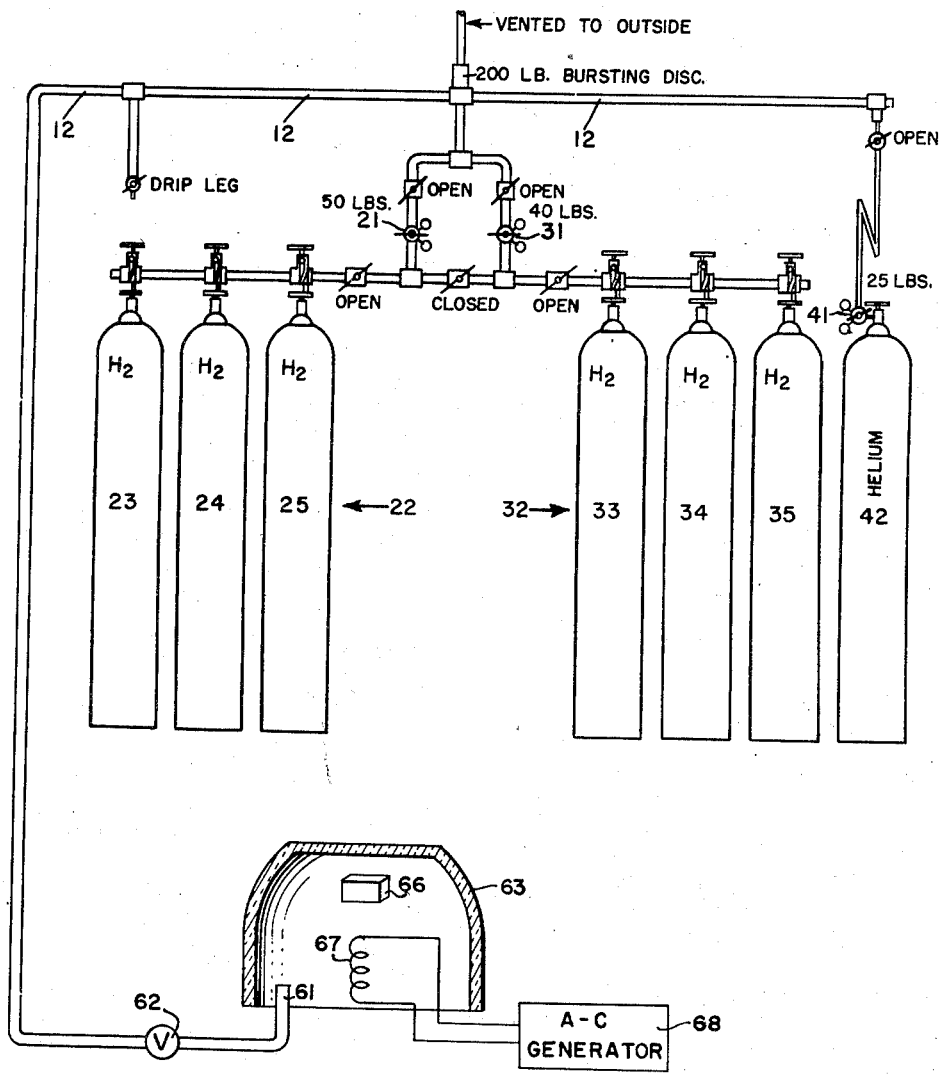
INVENTOR
Robert M. Carson
BY
W. E. Thibodeau, A. W. Dew
and J. D. Edgerton
ATTORNEYS United States Patent Office 2,784,959
Patented Mar. 12, 1957

2,784,959
SAFETY APPARATUS FOR FLUID-DISTRIBUTION LINES

Robert M. Carson, Silver Spring, Md.

Application March 2, 1955, Serial No. 491,799

4 Claims. (Cl. 266—5)

(Granted under Title 35, U. S. Code (1952), sec. 266)

The invention described herein may be manufactured and used by or for the Government for governmental purposes without the payment to me of any royalty thereon.

This invention relates to a safety device and method for use in connection with the distribution and use of hydrogen and other fluids that may present an explosion hazard.

Hydrogen gas is widely used in heat-treating and brazing processes. In a typical heat-treating installation the gas is piped from a remote reservoir, under pressure somewhat above atmospheric, to a bell jar or other enclosure in which it is desired to heat-treat an object in a hydrogen atmosphere. As long as the hydrogen pressure is maintained there is a continuous outward flow of hydrogen, and the system is explosion-safe. But if the hydrogen pressure should ever accidentally be allowed to fall to or below that of the atmosphere, air will enter the system. Hydrogen-air mixtures of certain proportions are notoriously explosive. The dangers to personnel and property are aggravated because of the elevated temperatures required for the heat-treating.

The prior art has taken great care to keep the hydrogen pressure from falling to or below atmospheric. Differential pressure controls, and pressure change indicators, are known and used. It is usual to have the distribution line connected to two banks of hydrogen tanks through a pressure-reducing network. Using known pressure-responsive regulators, the system is designed so that if the first bank of tanks becomes exhausted the second or reserve bank is automatically brought on the line. While the reserve bank is supplying the line the exhausted first bank can be replaced. However, human error in setting the valves or reducers, failure to replace exhausted tanks, or mechanical failure of components can permit the hydrogen supply to fall to or below atmospheric pressure. Despite the best safety efforts of the prior art, therefore, it occasionally happens that air enters the system, mixes with the hydrogen, and causes serious explosions.

My invention overcomes this explosion hazard by providing for automatic purging of the distribution line with an inert gas, in the event that the hydrogen pressure ever fails. I accomplish this by connecting to the distribution line, through a pressure-responsive valve of a known type, a reservoir of helium or other inert gas under pressure somewhat above atmospheric. If the hydrogen pressure ever falls to a dangerously low value the valve opens automatically and helium flows into the line, purging the system of hydrogen and eliminating the possibility of explosion.

A principal object of my invention is to provide economical and reliable methods and devices for preventing the formation of explosive mixtures of gases in the event of failure of pressure in a gas-containing system.

A particular object of the invention is to provide economical and reliable safety devices and methods for preventing explosions in hydrogen distribution lines.

A specific object is to provide an economical and reliable device and method for preventing explosive hydrogen-air mixtures from forming in enclosures in which objects are treated in hydrogen atmospheres at elevated temperatures.

Other objects, aspects, uses, and advantages of the invention will become apparent from the following description and from the accompanying drawing, in which—

Figure 1 is a diagram of a hydrogen supply installation incorporating safety features in accordance with my invention.

In Fig. 1, a distribution line 12 is connected through a 50-pound reducer 21 to primary hydrogen bank 22 consisting of tanks 23, 24, and 25; through a 40-pound reducer 31 to reserve hydrogen bank 32 consisting of tanks 33, 34, and 35; and through a 25-pound reducer 41 to a helium tank 42.

Suitable reducers are well known; they are essentially pressure-sensitive valves. The essential characteristic of 40-pound reducer 31, for example, is that it is closed when the pressure in line 12 is above 40 pounds per square inch but will open and permit the flow of hydrogen from bank 32 to line 12 if the pressure in line 12 falls below 40 pounds per square inch. Reducers 21 and 41 have corresponding characteristics but are actuated by line 12 pressures of 50 and 25 pounds respectively.

Since atmospheric pressure is approximately 15 pounds per square inch, it will be understood that all three reducers 21, 31, and 41 are actuated by pressures somewhat above atmospheric. The exact pressures at which the three reducers are actuated are not critical—50-, 40-, and 25-pound reducers are shown only by way of example. It is necessary, however, that reducer 41 be actuated by a pressure greater than atmospheric, that reducer 31 be actuated by a pressure greater than that required to actuate reducer 41, and that reducer 21 be actuated by a pressure greater than that required to actuate reducer 31. It will be understood that for proper operation of the system the respective pressures in banks 22 and 32 and tank 42 should be greater than the line 12 pressures at which respective associated reducers 21, 31, and 41 are actuated.

In normal operation line 12 is supplied most of the time by bank 22, and reducer 21 maintains the pressure of line 12 at 50 pounds. If bank 22 becomes depleted, so that the line 12 pressure drops below 40 pounds, reducer 31 opens so that reserve bank 32 can supply hydrogen to line 12.

If both hydrogen banks 22 and 32 become exhausted, or if for whatever reason the line 12 pressure falls below 25 pounds, reducer 41 automatically opens and permits helium or other inert gas from tank 42 to flow into line 12, maintaining the pressure in line 12 at least until the hydrogen in line 12 has been replaced by the inert gas from tank 42. In this manner the danger of air entering the system and mixing with the hydrogen to form an explosive mixture is eliminated.

In installations in which it is intended that hydrogen flow through a distribution line into and fill a bell jar or other enclosure it may be even more important to keep explosive mixtures from forming in the enclosure than to keep them from forming in the line. Such enclosures are often closed at the top; hydrogen intake and exhaust venting are provided at the bottom. Hydrogen being lighter than air, it tends to rise and fill the enclosure, overflowing through the bottom venting. For effective purging of such an enclosure in the event of failure of hydrogen pressure it is desirable that the purging gas be lighter than air, preferably of a lightness comparable to hydrogen; because of the tendency of such a light purging gas to rise in the enclosure it will most effectively prevent the formation of hydrogen-air mixtures within the enclosure. I prefer to use helium as the purging gas in such installations.

Such an installation is shown by those portions of the drawing now to be described. A nozzle 61 connected to line 12 through an outlet control valve 62 discharges hydrogen into the interior of a bell jar 63 or other container. Valve 62 is adjusted so that there is normally a small continuous flow of hydrogen into container 63, which is thus normally kept full of hydrogen. Inside container 63 may be positioned a metallic body 66 that is to be heat-treated in a hydrogen atmosphere. Body 66 is heated by means of an alternating current field produced by a coil 67 driven by an alternating-current generator 68, in accordance with well-known induction-heating techniques.

It will be apparent that the embodiments shown are only exemplary and that various modifications can be made in construction and arrangement within the scope of the invention as defined in the appended claims.

I claim:

1. In a system for heat-treating objects in an atmosphere of an air-combustible gas at elevated temperatures, said system including a heat-treatment container, a distribution line containing said gas at above-atmospheric pressure, and means for providing a continuous flow of said gas from said distribution line into said container, the safety improvement which comprises: a source of incombustible gas at above-atmospheric pressure; and a pressure-responsive valve connecting said source to said line, said valve being normally closed but being adapted to open if the pressure difference between the gas in said line and the surrounding air falls below a critical value, thereby purging said line and said container of said air-combustible gas.

2. The invention according to claim 1, said air-combustible gas being lighter than air, said container being closed at the top and open at the bottom, and said inert gas being lighter than said air-combustible gas.

3. The invention according to claim 2, said air-combustible gas being hydrogen and said inert gas being helium.

4. In a system having a container having at least a first opening and second opening, said system also having a distribution line for supplying an air-combustible gas at above atmospheric pressure to said container through said first opening, said second opening leading to the ambient air, safety means for preventing the formation of combustible air-gas mixtures in said container in the event of failure of pressure of said air-combustible gas, said safety means comprising: a source of incombustible gas at above-atmospheric pressure; and a pressure-responsive valve connecting said source to said line, said valve being normally closed but being adapted to open if the pressure difference between the gas in said line and the ambient air falls below a critical value, thereby purging said line and said container of said air-combustible gas.

References Cited in the file of this patent

UNITED STATES PATENTS

| | | |
|---|---|---|
| 2,049,987 | Willenborg | Aug. 4, 1936 |
| 2,402,826 | Lubbock | June 25, 1946 |
| 2,650,478 | Brown | Sept. 1, 1953 |

FOREIGN PATENTS

| | | |
|---|---|---|
| 973,979 | France | Feb. 16, 1951 |
| 467,334 | Great Britain | June 14, 1937 |